US008695765B2

(12) United States Patent
Danek et al.

(10) Patent No.: US 8,695,765 B2
(45) Date of Patent: Apr. 15, 2014

(54) SHOCK ABSORBER HAVING RESILIENT DEVICE IN REBOUND CHAMBER

(75) Inventors: Magnus Danek, Huddinge (SE); Henrik Schiölde, Vasteras (SE)

(73) Assignee: Ohins Racing AB, Upplands Vasby (SE)

( * ) Notice: Subject to any disclaimer, the term of this patent is extended or adjusted under 35 U.S.C. 154(b) by 834 days.

(21) Appl. No.: 12/442,266

(22) PCT Filed: Sep. 21, 2007

(86) PCT No.: PCT/SE2007/000831
§ 371 (c)(1),
(2), (4) Date: Jul. 8, 2009

(87) PCT Pub. No.: WO2008/036027
PCT Pub. Date: Mar. 27, 2008

(65) Prior Publication Data
US 2009/0260934 A1    Oct. 22, 2009

(30) Foreign Application Priority Data
Sep. 21, 2006    (SE) ..................................... 0601962

(51) Int. Cl.
*F16F 9/48*    (2006.01)
*F16F 9/22*    (2006.01)

(52) U.S. Cl.
USPC ........... 188/284; 188/297; 188/313; 188/314; 188/315; 188/32.13; 188/322.17; 188/322.21; 267/64.25; 267/64.28

(58) Field of Classification Search
USPC ......... 188/284, 297, 313–315, 32.13, 322.17, 188/322.21; 267/64.25, 64.28
See application file for complete search history.

(56) References Cited

U.S. PATENT DOCUMENTS 2,607,443 A * 8/1952 Mayo et al. .................... 188/320
3,250,526 A * 5/1966 Kress .......................... 267/64.16
(Continued)

FOREIGN PATENT DOCUMENTS

| CH | 639733 | 11/1983 |
| DE | 10052789 | 6/2001 |
| EP | 0 322 608 | 7/1989 |
| EP | 0 601 982 A1 | 6/1994 |

OTHER PUBLICATIONS

International Search Report, dated Dec. 13, 2007, 3 pages.

*Primary Examiner* — Pamela Rodriguez
*Assistant Examiner* — Mahbubur Rashid
(74) *Attorney, Agent, or Firm* — Knobbe Martens Olson & Bear, LLP

(57) ABSTRACT

A shock absorber comprises a damping cylinder pressurized by a system pressure and divided by a piston into a compression chamber and a return chamber. A resilient device is disposed in the return chamber. The resilient device comprises a pressurizing member or pressurizing medium disposed in an inner volume that is delimited from the return chamber. The resilient device acts upon the damping medium volume in the return chamber such that the pressure initially during a compression stroke does not fall below a predetermined minimum pressure. As long as the pressure in the return chamber is less than the pressure created by the resilient device, the device is able to absorb energy. When the pressure in the return chamber is greater than the pressure created by the resilient device, the device becomes inflexible. The resilient device compensates for pressure reduction in the return chamber that occurs under rapid damping movements and that can cause cavitation during a compression stroke.

17 Claims, 5 Drawing Sheets

(56) References Cited

U.S. PATENT DOCUMENTS

| | | | |
|---|---|---|---|
| 3,331,601 A * | 7/1967 | Riehl | 267/64.19 |
| 3,519,109 A * | 7/1970 | Whisler, Jr. | 188/269 |
| 4,109,767 A * | 8/1978 | Nandyal et al. | 188/315 |
| 4,602,707 A * | 7/1986 | Zumwinkel et al. | 188/315 |
| 6,161,662 A * | 12/2000 | Johnston et al. | 188/282.3 |
| 6,644,446 B2 * | 11/2003 | Kachi et al. | 188/322.17 |
| 2004/0134730 A1 | 7/2004 | Forster | |
| 2004/0262107 A1* | 12/2004 | Nandyal | 188/314 |
| 2007/0119672 A1* | 5/2007 | Becker | 188/314 |

* cited by examiner

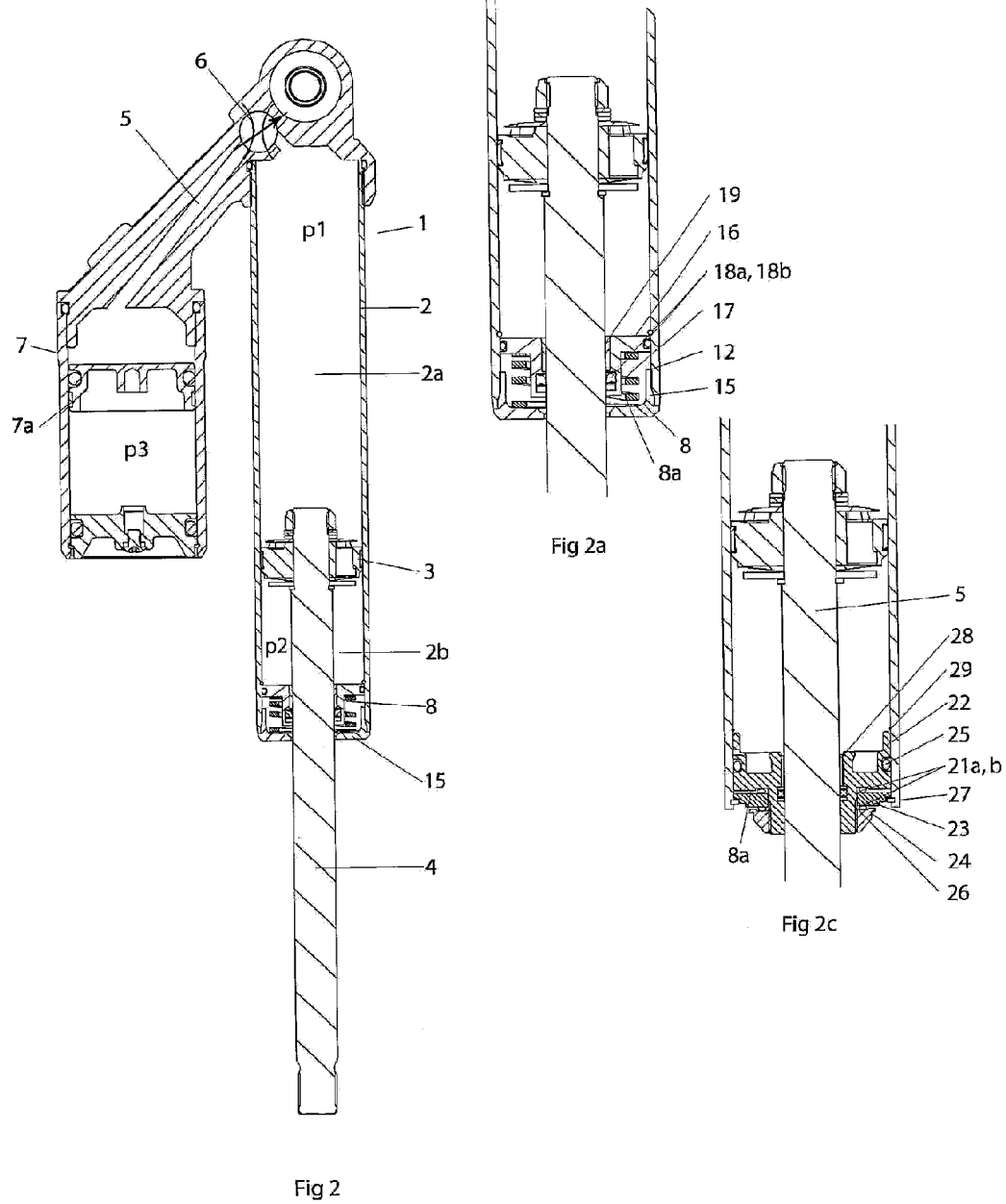

SHOCK ABSORBER HAVING RESILIENT DEVICE IN REBOUND CHAMBER

CROSS-REFERENCE TO RELATED APPLICATIONS

This application is a U.S. National Phase of International Application No. PCT/SE2007/000831, filed Sep. 21, 2007, which is based upon Swedish Patent Application No. 0601962-4, filed Sep. 21, 2006, each of which is hereby incorporated by reference in its entirety and priority is claimed to each of these applications.

BACKGROUND OF THE INVENTION

1. Field of the Invention

Certain features, aspects and advantages of the present invention relate to a method for controlling a pressure balance between two chambers of a shock absorber, in which a damping medium pressure in a return chamber preferably does not fall below a preselected minimum pressure, whereby the likelihood of cavitation is greatly reduced. As a result of the method, energy is stored in the shock absorber so that a pressure is built up in a resilient device, preferably in the form of an accumulator, that is disposed in the return chamber. Thus, a resilient function is created in the resilient device, which initially during the compression stroke increases the pressure in the return chamber.

Certain features, aspects and advantages of the present invention also relate to a pressurized shock absorber in which a resilient device is positioned within or directly adjacent to a return chamber, the resilient device comprising a pressurizing member or pressurizing medium that acts in an inner volume delimited from the return chamber.

2. Description of the Related Art

A shock absorber operates by adjusting the pressure ratio between the pressure exerted upon the damping medium in the compression chamber and the pressure exerted upon the damping medium in the return chamber respectively. A high pressure gives a higher rigidity. In other words, a greater force is required to compress the damping medium when operating under a higher pressure. The piston that separates the compression and the return chamber can be provided with flow-adjusting valves or can be leak-tight when used in combination with externally mounted valves that adjust the flow between the chambers.

The pressure drop over the piston determines the pressure ratio and the pressure drop can be altered dynamically by having a system pressure act upon the damping medium. The system pressure can be determined by a pressurizing member mounted in or on the shock absorber body. The pressurizing member is connected to and pressurizes either just the compression chamber or both the compression and the return chamber. The pressurizing member is designed to receive the pressure medium that is displaced by the piston rod, to absorb the changes in damping medium volume caused by temperature differences, and to generate a certain basic pressure (i.e., the system pressure) in the shock absorber. The damping medium flow between the pressurizing member and both or one of the damping chambers can be adjustable with one or more adjustable valves, hereinafter referred to as cylinder valves.

In a compression stroke in an ideal shock absorber with a cylinder valve, the pressure in the return chamber is constantly equal to the system pressure. The counterpressure that is created with the aid of the cylinder valve therefore compensates for the reduction in pressure in the return chamber which is brought about by the pressure drop over the piston.

In a real shock absorber, an ideal compression stroke is impossible because the rigidity in the return chamber is higher than the rigidity in the compression chamber when the shock absorber approaches the rebounded state. The pressure in the compression chamber does not build up as fast as the pressure in the return chamber falls, with the result that it is not possible to use the cylinder valve to increase the pressure in the return chamber. With too low a pressure in the return chamber, the risk of cavitation increases and cavitation causes a loss of damping forces.

Examples of previously known attempts to solve this problem can be found in US2004134730 or in the Applicant's own patent EP0601982. EP0322608 further shows an embodiment in which the damping medium is conducted both through the piston and through a duct outside the damping chamber depending on the stroke rate. In the case of certain rapid compression movements, however, it is difficult for the damping medium to pass through this duct, which means that the pressure in the return chamber nonetheless falls below that in the compression chamber.

In document DE10052789, a shock absorber is shown that solves another problem, namely the adjustment of the damping flow between the return chamber and a space designed to absorb the piston rod displacement and any differences in damping medium volume due to temperature changes, for example. The flow of damping medium from the return chamber into the space is adjusted with an adjustable damping valve. The valve plate of the adjustable damping valve is pretensioned with a resilient pressurizing device disposed in a sleeve-shaped part around the outer strut of the shock absorber. By pressurizing the valve plate in varying amounts, the damping medium flows through the valve only once certain damping movement speeds are attained.

SUMMARY OF THE INVENTION

When a resilient device of the kind described in DE10052789, for example, is directly disposed in the return chamber without being made to act upon the valves of the shock absorber, an unexpected solution emerges to the above-described problem. Initially during the compression stroke, a resilience is then created, which acts upon the damping medium volume in the return chamber such that the pressure in the chamber is less likely to fall below a predetermined minimum pressure which gives rise to cavitation (i.e. the resilient device compensates for the reduction in pressure in the return chamber caused by the pressure drop over the main piston that occurs during rapid damping movements). The minimum pressure can be the system pressure, for example.

The resilient device can be compared with an accumulator in which energy is stored through a build-up of pressure in the device and in which the stored energy is used to create the resilient function. The resilient device can be disposed in both a shock absorber with external oil ducts to the valves, such as the shock absorbers in US2004134730, EP0601982 and EP0322608, or in a simpler variant of a shock absorber in which the oil flow between the chambers only takes place through the piston.

Once the pressure in the return chamber has risen above the minimum level, the effect of the resilient device and the build-up of force during the remaining part of the compression stroke are purely dependent on the basic damping character of the shock absorber. The pressure that is required to start an expansion of the resilient device therefore is chosen such that it is not resilient under normal system pressure but, when the pressure is lowered, the resilient function starts. Expediently, the pressure preferably is chosen such that a sufficient margin against cavitation is provided.

During a return stroke, the pressure in the return chamber is always greater than or equal to the system pressure. The resilient device then assumes a bottomed state and the resilient function ceases. A bottomed state is shown, for example, in FIGS. 1a and 1b.

The resilient device can be variously configured. In most embodiments, the resilient device comprises an elastic member that can be fixed to the piston rod directly adjacent to the main piston, adjacent to the outer end of the damping cylinder or in a space in the piston rod. The resilient device works as an accumulator that is designed to store the energy of liquids and gases. The energy is stored by pressure being built up in the device either via a mechanical elastic member, such as a spring or an O-ring, or by pressurization with a compressible medium, for example a gas. These embodiments are set out in greater detail below.

In an embodiment, the resilient function of the member is created by pretensioning of a seal placed between two mutually adjustable parts. Different pretensionings of the seal and different choices of seal size and material produce different magnitudes of the resilience brought about by the member.

The resilient device also can be made up of two mutually adjustable parts, in which a spring with a certain defined spring constant is disposed between the parts. At a certain force created by the pressure in the return chamber, which force exceeds the force from the seal or the spring and is preferably determined by the system pressure, the parts bottom one against the other against, for example, a lug disposed on the second part. Once the parts have bottomed, pressure and force are built up without further effect of the elasticity of the seal and the force of the spring respectively.

The resilient device can also be made up of two mutually displaceable and sealed parts in which the volume formed between the parts is filled with pressurizing medium, for example gas, so that a certain pressure prevails. The pressure that acts in the inner volume of the device interacts with the pressure from the damping medium in the return chamber. As long as the pressure in the return chamber damping medium is less than the pressure in the space between the sealed parts, the two parts can move toward each other or away from each other. When the pressure ratios are altered and the pressure in the damping medium becomes greater than the pressure in the space between the sealed-off parts, the two parts move together and bottom against each other and the device becomes inflexible. That is to say, at normal system pressure or above, it is not resilient, but when the pressure is lowered, the resilient function sets in.

Because the force and pressure ratios between the compression and the return chamber are now controllable, a further advantage with system is that the valve disposed between the compression chamber and the pressurizing member can always be used to counteract a fall in pressure on the return side of the piston and to adjust for the desired damping character.

In some embodiments of the invention, the shock absorber is constructed such that the function involving the resilient device is included in a shock absorber in which the pressure side of the pressurization vessel is always connected to both the compression and the return chamber to increase the likelihood that a positive basic pressure always acts upon the low-pressure side of the shock absorber piston.

BRIEF DESCRIPTION OF THE DRAWINGS

Certain features, aspects and advantages of the present invention are described in greater detail below with references to the accompanying drawings, in which:

FIG. 2 shows a sectional view of a shock absorber comprising a resilient device according to a third embodiment with pressure equalization only over the piston;

FIG. 2a shows a detail view of the third embodiment, in which the device is bottomed;

FIG. 2c shows a detail view of the fifth embodiment;

DETAILED DESCRIPTION OF THE PREFERRED EMBODIMENT

Figure 1:
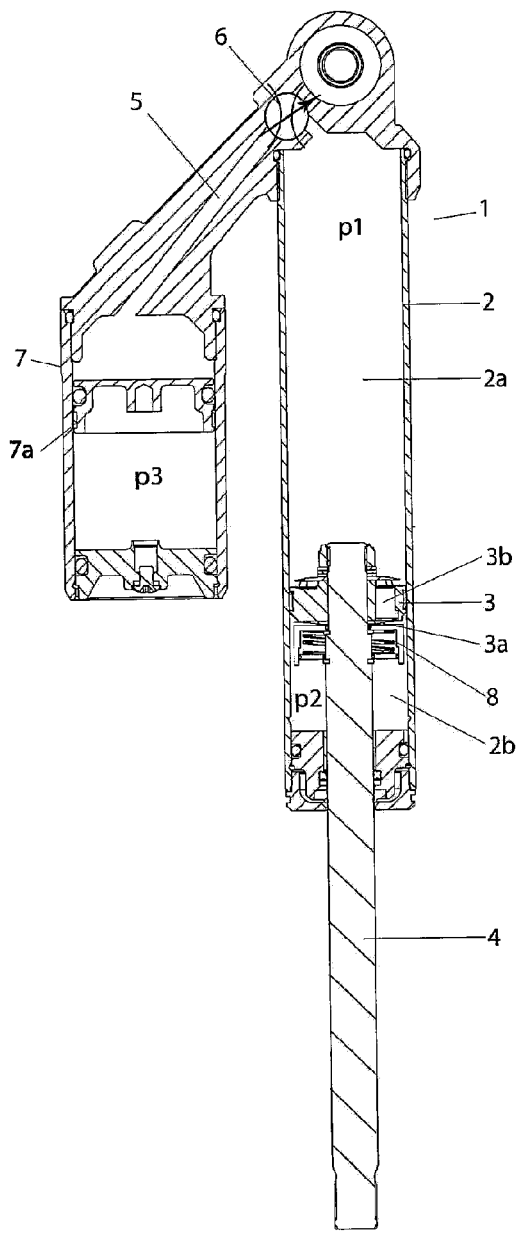
FIG. 1 shows a sectional view of a shock absorber comprising a resilient device according to a first embodiment with pressure equalization only over a piston.

FIG. 1 shows a sectional view of a shock absorber 1 that is arranged and configured according to a first embodiment. A cylindrical body 2 of the shock absorber 1 is divided by a main piston 3 disposed on a piston rod 4 into a compression chamber 2a and a return chamber 2b. The main piston 3 preferably is provided with valves 3a in the form of washers/shims, for example, which contribute to a certain flow between the compression chamber 2a and the return chamber 2b via flow passages 3b disposed in the main piston 3. The main piston 3 can also be solid (see FIG. 4), in which case the damping medium flow between the chambers 2a, 2b can be adjusted via externally disposed valves 41a, 41b.

A variable first pressure p1 prevails in the compression chamber 2a and a variable second pressure p2 prevails in the return chamber 2b. Connected to the compression chamber 2a, via a duct 5 and an adjustable valve 6 disposed therein, is a pressurizing vessel 7.

The inner volume of the pressurizing vessel 7 preferably can be divided by a floating piston 7a that is acted upon by a third pressure p3, or system pressure, that is created, for example, by gas or a mechanical pressure member such as a spring or the like, which then creates a pressurizing force. The floating piston 7a also can be replaced by a pressurized rubber bladder or corresponding device for pressurizing a medium. The valve 6 preferably adjusts the flow between the pressurization vessel 7 and the compression chamber 2a. Any suitable valve configuration can be used.

In the return chamber 2b there is disposed a resilient device 8, which preferably comprises an elastic member 9.

Figure 1A:
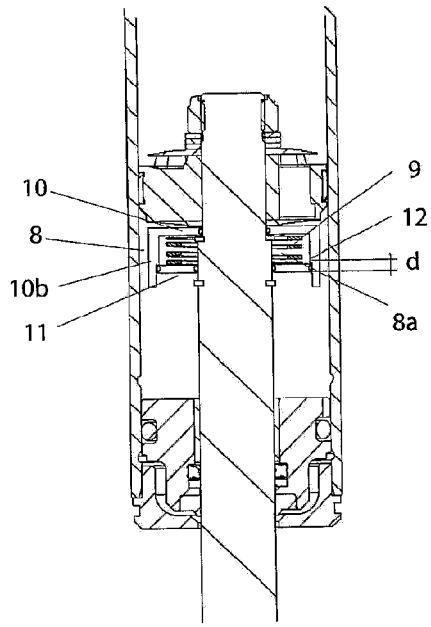
FIG. 1a shows a detail view of the first embodiment, in which the device is bottomed.

An enlarged view of an embodiment the resilient device 8 is shown in FIG. 1a. The resilient device 8 can be fixed to the piston rod 4 directly adjacent to the main piston 3, but spaced from the valves 3a of the main piston 3, and the resilient function is achieved by the enclosure of an elastic member 9 by two mutually movable and sealed first and second spring parts 10, 11 or by a first spring part 10 and second spring part 11 in which one of the parts 10, 11 moves relative to the other. The first spring part 10 is cup-shaped with an outer collar part 10b, and within it moves the second spring part 11.

When the variable second pressure p2 in the return chamber 2b falls below the system pressure p3 or other predetermined minimum pressure level due to, for example, a fast stroke in which the volume of the return chamber 2b increases, the force that is created by the second pressure p2 upon the resilient device 8 is less than the counterholding force created by the elastic member 9, so that the movable spring parts 10, 11 are moved apart by the elastic member 9. Once a certain predetermined second pressure p2, preferably greater than or equal to the system pressure p3, acts upon the resilient device 8, the effect of the latter is terminated (i.e., the resilient function disappears and the build-up of force during the compression stroke takes place without the effect of the device 8). This is made possible by the fact that the two mutually movable spring parts 10, 11 hit a mechanical stop 12, which can be in the form of a lug created in the outer collar part 10b of the first spring member 10, when the elastic member has been compressed by a certain distance d. The mechanical stop 12 preferably is placed at the distance d at which equilibrium generally prevails between the force that is produced by a compression of the elastic member 9 and the force which acts upon the pressure zone of the movable second spring part 11, which pressure zone is caused by the second pressure p2 in the return chamber 2b. The stop 12 also can be placed at such a distance that a sufficient margin against cavitation is reached. Preferably the counterpressure created by the resilient device 8 is between about 1 and about 3 bar lower than the system pressure p3 in the pressurization vessel 7.

Figure 1B:
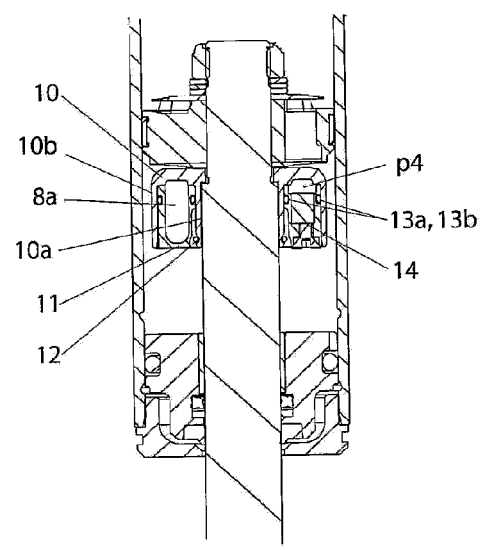
FIG. 1b shows a detail view of a second embodiment comprising a resilient device, in which the device is bottomed.

Also in the embodiment shown in FIG. 1b, the resilient device 8 comprises two mutually adjustable first and second spring parts 10, 11 sealed with seals 13a, 13b. The first spring part 10 is fixed between a prominent part of the piston rod 4 and the main piston 3. For the formation of the space 8a, the first spring part 10 has an inner collar part 10a and an outer collar part 10b, in which the inner collar part 10a directly surrounds the piston rod 4 and the outer collar part 10b is disposed at a radial distance from the inner collar part. The resilience is created because the second spring part 11 is disposed in the first spring part 10, between the inner collar part 10a and the outer collar part 10b. In this embodiment, the stop 12 is a locking ring fixed to the inner collar part 10a.

The space 8a formed between the spring parts 10, 11 preferably is filled with a pressurizing medium, such as a gas or the like, so that a certain fourth pressure p4 prevails in the space 8a. If the fourth pressure p4 is less than the second pressure p2, which is the case throughout the return stroke, the first and second spring parts 10, 11 are pressed together so that the volume in the space 8a becomes as small as possible and the pressure balance in the shock absorber is created between the pressure p2 in the return chamber and the pressure p1 in the compression chamber. On the other hand, if the fourth pressure p4 is greater than the second pressure p2 in the return chamber 2b, which can happen initially during a compression stroke, the first and second spring parts 10, 11 are mutually displaced so that the volume in the space 8a increases and a pressure balance is created between the pressure in the space 8a and the pressure in the return chamber 2b. The fourth pressure p4 that acts in the space 8a is therefore chosen such that the second pressure p2 in the return chamber 2b is always kept higher than the preselected minimum pressure, which can be the system pressure p3 or some other chosen pressure. The device otherwise functions in the same way as the device described in FIG. 1a.

The resilient device 8 forms a unit which is easily removable from the piston rod 4. The fact that the entire unit can be removed also makes it easy to alter the inner fourth pressure p4 in the unit. This alteration can be made, for example, by filling gas through the filling member 14 before the device 8 is mounted on the piston rod 4.

FIG. 2 shows an embodiment in which the resilient device 8 is mounted in the return chamber 2b adjacent to a closing cap 15 fixed to that end of the damping cylinder 2 through which the piston rod 4 extends. A number of different pressurizing members 8, such as those described below, can be used.

In FIG. 2a, the simplest form of resilient device 8 is shown, in which a floating spring piston 16 is disposed next to the closing cap 15. The floating spring piston 16 rests on an elastic member 17, in this case a spring, which in turn rests on the closing cap 15 that is fixed to the damping cylinder 2. The floating spring piston 16 is sealed against the piston rod 5 with an inner seal 18a and against the damping cylinder 2 with an outer seal 18b. In order to facilitate the to and from movement of the floating spring piston 16 along the piston rod 4, a bushing 19 is disposed between the floating spring piston 16 and the piston rod 4. At a certain force created by the pressure in the return chamber and exceeding the force from the elastic member 17, the floating spring piston 16 is designed such that it bottoms against a mechanical stop 12 disposed in the piston 16. Once the spring piston 16 has bottomed, pressure and force are built up without further influence from the resilient device 8.

Figure 2B:
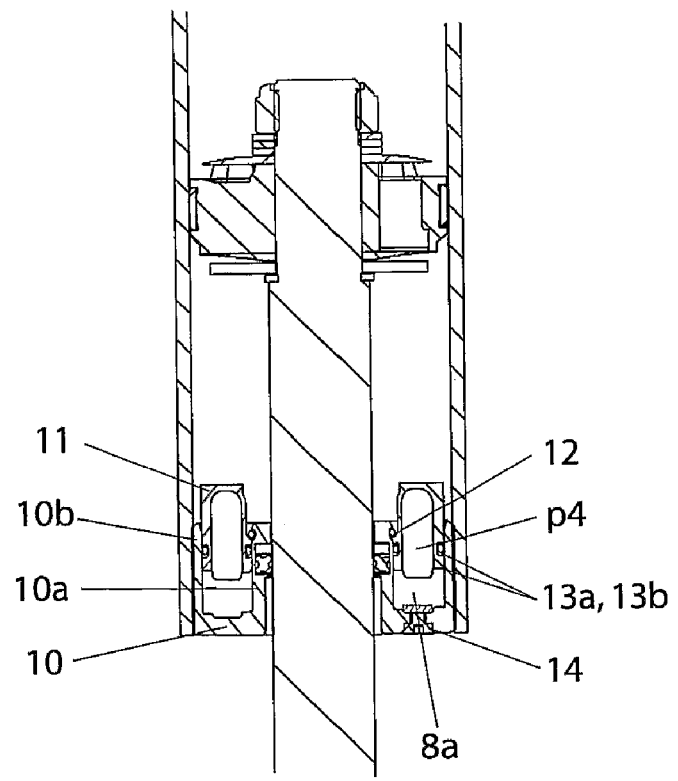
FIG. 2b shows a detail view of the fourth embodiment.

In FIG. 2b, a resilient device 8 is shown, in which the device comprises two first and second spring parts 10, 11, which are adjustable relative to each other (i.e., at least one is adjustable relative to the other) and are sealed with seals 13a, 13b. In the illustrated embodiment, the first spring part 10 is arranged as a seal head and is fixed with a thread, for example, in the damping cylinder 2. The first spring part 10 also has an inner collar part 10a and an outer collar part 10b, and in the space between these collar parts 10a, 10b there is disposed the second spring part 11. The space 8a formed between the spring parts 10, 11 is filled with a pressurizing medium, such as a gas, for example, so that a certain fourth pressure p4 prevails. The fourth pressure p4 is chosen such that it initially deters the second pressure p2 from acquiring a value lower than the system pressure p3. A stop 12 reduces the likelihood of the spring parts 10 and 11 from being moved apart and, in this embodiment, comprises a locking ring positioned in a groove in the first spring part 10, which locking ring interacts with a lug in the second spring part 11.

By a valve or similar pressurization member 14, the fourth pressure p4 in the inner space 8a of the resilient device 8 can be adjusted on the basis of, and adapted to, the desired level, in order to compensate for a possible change in the system pressure p3 in the pressurizing vessel 7, for example. It is possible to achieve the desired pressure in the device when the component parts are mounted, i.e. the geometry of the component parts is chosen such that a suitable compression of the enclosed volume is achieved.

In the embodiment shown in FIG. 2c, the device is resilient by virtue of the pretensioning of two seals 21a, 21b disposed between three mutually adjustable third, fourth and fifth spring parts 22, 23, 24.

Different pretensionings of the lower seal 21b and different choices of seal size and material produce different magnitudes of resilience which can be brought about by the device. The pretensioning can be adjusted by the outer fifth spring part 24 being screwed in or out on a corresponding thread on the third spring part 22.

The third spring part 22 acts both as a sealing seal head on the damping cylinder 2 and as a working part in the resilient device 8. The third spring part 22 is sealed against the damping cylinder with a seal 25 and against the piston rod 5 with a seal 26. Between the piston rod 5 and the third spring part 22 there also is disposed a bushing 28 for reducing the friction between the parts 22, 28. In order to prevent the whole of the third spring part 22 from being moved too far into the return chamber, a locking ring 29 is disposed in the damping cylinder 2. The lower part of the third spring part 22 bears against a seal 21a resting on the centermost fourth spring part 23. The centermost fourth spring part 23 preferably is held tight inside the damping cylinder 2 with a locking ring 27.

At a certain force created by the pressure in the return chamber and exceeding the force from the seals 21a, 21b, the third, fourth and fifth spring parts 22, 23, 24 bottom one against the other. Once the spring parts 22, 23, 24 have bottomed, pressure and force build up without any further effect of the elasticity of the seal.

Figure 3:
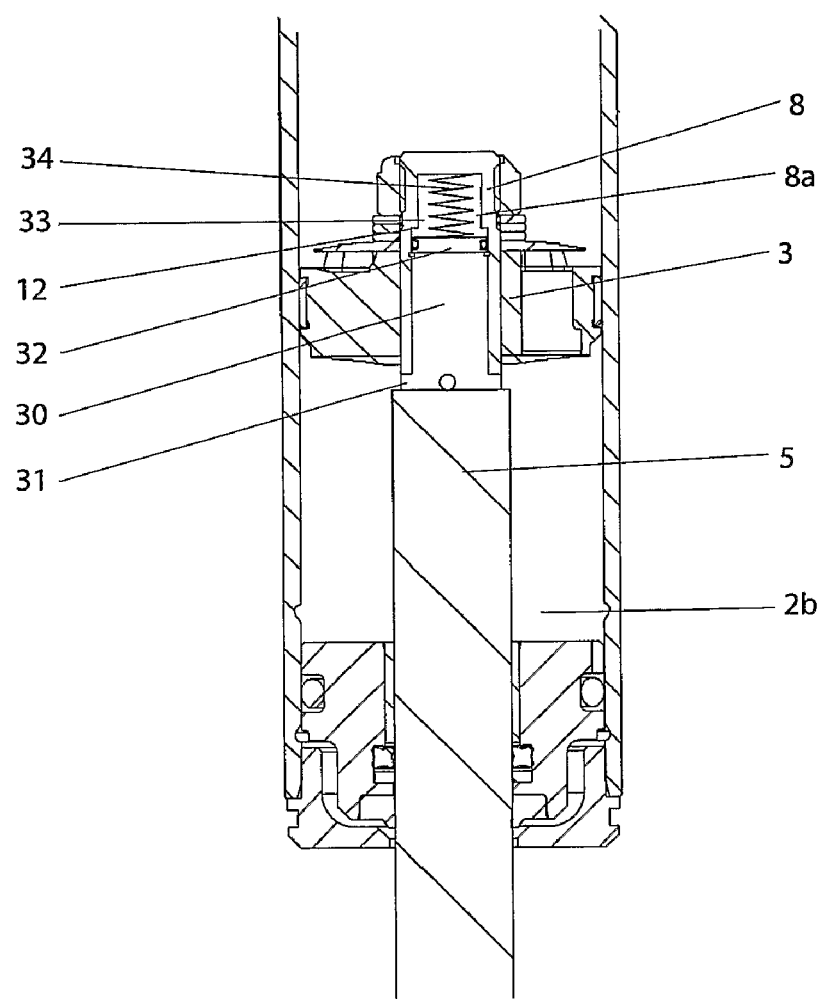
FIG. 3 shows a detail view of a sixth embodiment.

In FIG. 3, a shock absorber is shown in which the resilient device 8 is disposed inside a recess formed in a piston rod (i.e., an internal volume 30) in the piston rod 5. The piston rod volume 30 is connected to the return chamber 2b via one or more ducts or holes 31. The resilient device consists of a piston 32, which is movable in the longitudinal (i.e., axial) direction of the piston rod 5 and delimits the volume 30 from another volume 33. The piston 32 rests on an elastic member 34, for example a spring, a gas volume or an O-ring, and the distance by which the piston can be compressed is determined by a mechanical stop 12. The embodiment shown in FIG. 3 differs primarily from the embodiments described above in the positioning of the moving member (i.e., the piston) but the embodiment of FIG. 3 is believed to operate in a very similar manner as the embodiments described above.

Figure 4:
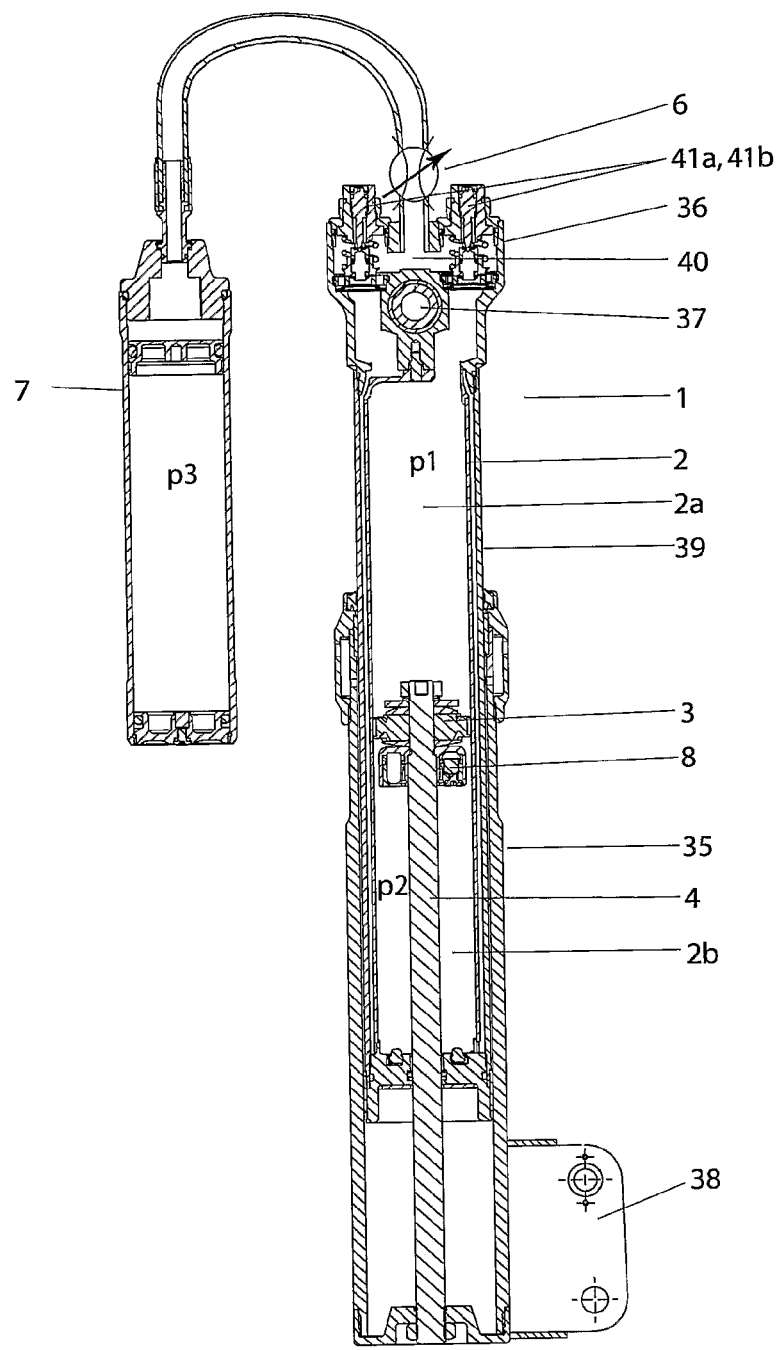
FIG. 4 shows a sectional view of a shock absorber according to a seventh embodiment with pressure equalization both over the piston and in a duct outside the piston.

FIG. 4 shows a spring strut for a vehicle that comprises a shock absorber 1 that is telescopically introduced into an outer strut 35. The shock absorber 1 comprises a damping cylinder 2, a main piston 3, a piston rod 4, an upper valve housing 36 and a pressurization vessel 7.

An upper part 37 of the shock absorber 1 is connected to a part of a vehicle chassis (not shown), and a lower part of the spring strut 35 is connected to a wheel via a fastening member 38. In the lower part of the outer strut 35, the piston rod 6 is fixedly mounted, which means that the shock absorber 1 moves in and out in the outer strut 35 upon relative movements between the chassis and the wheel.

Around the damping cylinder 2, there is additionally disposed a cylindrical tube 39. Damping medium flows between the damping cylinder 2 and the cylindrical tube 39 during both the return and the compression stroke. Both the return and the compression chamber are therefore connected to a common volume 40 in the valve housing 36, and by connecting the common volume 40 to that space in the pressurization vessel 7 which is pressurized by the gas pressure p3, a shock absorber is created that operates substantially always under a positive pressure during both the compression stroke and the return stroke. The arrangement of two separate valves 41a, 41b in the valve housing 36 allows the character of the damping force in the two stroke directions to also be adjusted quite separately and independently of each other.

In the return chamber 2b, the resilient device 8 preferably is placed adjacent to the main piston 3. All previously described resilient devices 8 and their respective positioning can also be used, of course, in this embodiment of the shock absorber.

The invention is not limited to the embodiment shown above by way of example, but may be modified within the scope of the following patent claims and the inventive concept. In addition, it is possible to combine various aspects of the various embodiments described above.

What is claimed is:

1. A method for controlling the pressure balance between two working chambers filled with damping medium and pressurized by a system pressure of a shock absorber, in which the shock absorber comprises a cylindrical body filled with a damping medium in the form of an oil and is divided by a main piston into a compression chamber and a return chamber in which a variable first damping medium pressure prevails in the compression chamber and a variable second damping medium pressure prevails in the return chamber, the second damping medium pressure in the return chamber being greater than a preselected minimum pressure due to a resilient device in the form of an accumulator provided in or connected to the return chamber such that energy is stored through a build-up of pressure in a sealed volume of the resilient device delimited against the return chamber and in which the stored energy is used to create a resilient function which gives rise to an increased pressure in the return chamber initially during the compression stroke, wherein the resilient device comprises a first spring part and a second spring part, at least one of the first and second spring parts being moveable relative to the other of the first and second spring parts, the first and second spring parts being mutually sealed and the first spring part being arranged to move within the second spring part.

2. The method as claimed in claim 1, wherein the pressure is built up in the resilient device by a compressed mechanical elastic member acting upon a pressurizing zone disposed inside the resilient device.

3. The method as claimed in claim 1, wherein the pressure is built up in the resilient device by a compressible medium introduced into the sealed volume delimited against the return chamber and being pressurized to a predetermined fourth pressure.

4. The method as claimed in claim 3, wherein the predetermined fourth pressure generally coincides with the preselected minimum pressure.

5. The method as claimed in claim 1, characterized in that the preselected minimum pressure is lower than or equal to the system pressure with which the shock absorber is pressurized.

6. The method as claimed in claim 1, wherein once a certain predetermined pressure ratio between the second damping medium pressure in the return chamber and the preselected minimum pressure prevails in the shock absorber, an effect of the resilient device is terminated by a mechanical stop.

7. A shock absorber intended for a vehicle, the shock absorber comprising a damping chamber adapted to be filled by a damping medium, the damping chamber adapted to be pressurized with a system pressure and the damping chamber being defined by a damping cylinder, the damping cylinder being divided by a main piston fastened to a piston rod, the main piston dividing the damping cylinder into a compression chamber and a return chamber, a variable first damping medium pressure adapted to act in the compression chamber, a variable second damping medium pressure adapted to act in the return chamber, a resilient device disposed directly adjacent to the return chamber, the resilient device comprising at least one of a pressurizing member and a pressurizing medium disposed in a sealed inner volume delimited against the return chamber such that no fluid passes between the sealed inner volume of the resilient device and the return chamber, wherein the resilient device comprises a first spring part and a second spring part, at least one of the first and second spring parts being moveable relative to the other of the first and second spring parts, the first and second spring parts being mutually sealed and the first spring part being arranged to move within the second spring part.

8. The shock absorber as claimed in claim 7, wherein an energy-absorbing mechanical elastic member is positioned within the resilient device.

9. The shock absorber as claimed in claim 7, wherein the sealed inner volume of the resilient device is adapted to be filled with an energy-absorbing, pressurizing compressible medium such that, when filled, a certain pressure prevails within the volume.

10. The shock absorber as claimed in claim 7, wherein the resilient device is fixed to the piston rod closely adjacent to the main piston.

11. The shock absorber as claimed in claim 7, wherein the resilient device is mounted in the return chamber adjacent to an end of the damping cylinder through which the piston rod extends.

12. The shock absorber as claimed in claim 7, wherein the resilient device comprises at least one member that moves axially within the shock absorber.

13. The shock absorber as claimed in claim 7, wherein the resilient device comprises a piston disposed in and at least partially defining a piston rod volume inside the piston rod, the piston rod volume being connected to the return chamber.

14. The shock absorber as claimed in claim 7, wherein a spring characteristic of the resilient device is adjustable from the outside of the damping cylinder.

15. The shock absorber as claimed in claim 14, wherein the adjustable spring characteristic is created by a pretensioning of the mechanical member by adjustment of movable parts in relation to one another.

16. The shock absorber as claimed in claim 14, wherein the adjustable spring characteristic is created by replenishment or draining of pressurizing medium in the sealed inner volume of the resilient device.

17. The shock absorber as claimed in claim 7, wherein compression of the resilient device is limited to a predetermined distance by a mechanical stop.

* * * * *